United States Patent
Zhou et al.

(10) Patent No.: US 6,756,151 B2
(45) Date of Patent: Jun. 29, 2004

(54) UNIDIRECTIONAL DRAINING DEVICE

(75) Inventors: Shijian Zhou, Carmel, IN (US); Timothy H. Kline, Anderson, IN (US); Donald F. Turner, Farmland, IN (US); James R. Nowakowski, Indianapolis, IN (US)

(73) Assignee: General Motors Corporation, Detroit, MI (US)

( * ) Notice: Subject to any disclaimer, the term of this patent is extended or adjusted under 35 U.S.C. 154(b) by 354 days.

(21) Appl. No.: 10/039,976

(22) Filed: Jan. 8, 2002

(65) Prior Publication Data

US 2003/0129482 A1 Jul. 10, 2003

(51) Int. Cl.[7] .............................................. H01M 2/12
(52) U.S. Cl. ............................. 429/86; 429/89; 4/650; 4/653; 4/671; 4/679; 4/286; 4/295; 138/42; D15/5

(58) Field of Search .......................... 429/86, 89, 650, 429/653, 671, 679, 286, 295; 138/42; D15/5

(56) References Cited

U.S. PATENT DOCUMENTS

| | | | | | |
|---|---|---|---|---|---|
| 1,107,363 | A | * | 8/1914 | Schmidt | 4/689 |
| 3,220,695 | A | * | 11/1965 | Downey et al. | 251/263 |
| 6,195,819 | B1 | * | 3/2001 | Wang | 4/689 |
| 6,219,861 | B1 | * | 4/2001 | Chen | 4/689 |

* cited by examiner

*Primary Examiner*—Hoa Van Le
(74) *Attorney, Agent, or Firm*—Christopher DeVries

(57) ABSTRACT

A draining device including a threaded portion, the threaded portion depending outwardly from an annular portion and having an inner opening in fluid communication with a pair of openings in the annular portion, where said pair of openings provides a pathway for draining.

16 Claims, 3 Drawing Sheets

UNIDIRECTIONAL DRAINING DEVICE

TECHNICAL FIELD

The present invention relates to a unidirectional draining device and more particularly to a unidirectional draining device for a battery storage housing.

BACKGROUND OF THE INVENTION

Hybrid electric vehicles employ an internal combustion engine and an electric motor which can alternatively, or in conjunction, provide a driving force for a vehicle.

There are several types of electric propulsion systems for vehicles. For example, a pure electric drive vehicle, a series hybrid system, a parallel hybrid system, and a combined series-parallel hybrid system are just a few of the designs currently being considered.

One common factor of all these designs is that there is a need for a high-efficiency battery storage system. The battery storage system houses a plurality of batteries or an electric storage medium.

SUMMARY OF THE INVENTION

The present invention includes a draining device having an engagement portion depending outwardly from an annular portion, the engagement portion having an inner opening in fluid communication with a pair of openings in the annular portion. The engagement portion is coupled to an opening of a housing. The annular portion extends outwardly from the engagement portion to define a shoulder portion. The shoulder portion contacts the housing when the engagement portion is engaged in the opening. The pair of openings provide a unidirectional pathway for fluid to pass from the interior of the housing to the exterior.

A housing for an electric storage medium of a vehicle having a plurality of openings in a lower surface of the housing, a plurality of plug members each having a threaded portion, an annular member and a head portion are engaged into the openings of the housing. The annular member is disposed between the head portion and the threaded portion. The threaded portion of the plug member is configured to be received and engaged in one of the plurality of openings. Each plug member has an elongated opening disposed within the threaded portion, and the elongated opening is in fluid communication with a pair of openings in the annular member.

The above-described and other features and advantages of the present invention will be appreciated and understood by those skilled in the art from the following detailed description, drawings, and appended claims.

DESCRIPTION OF THE PREFERRED EMBODIMENT

Figure 1:
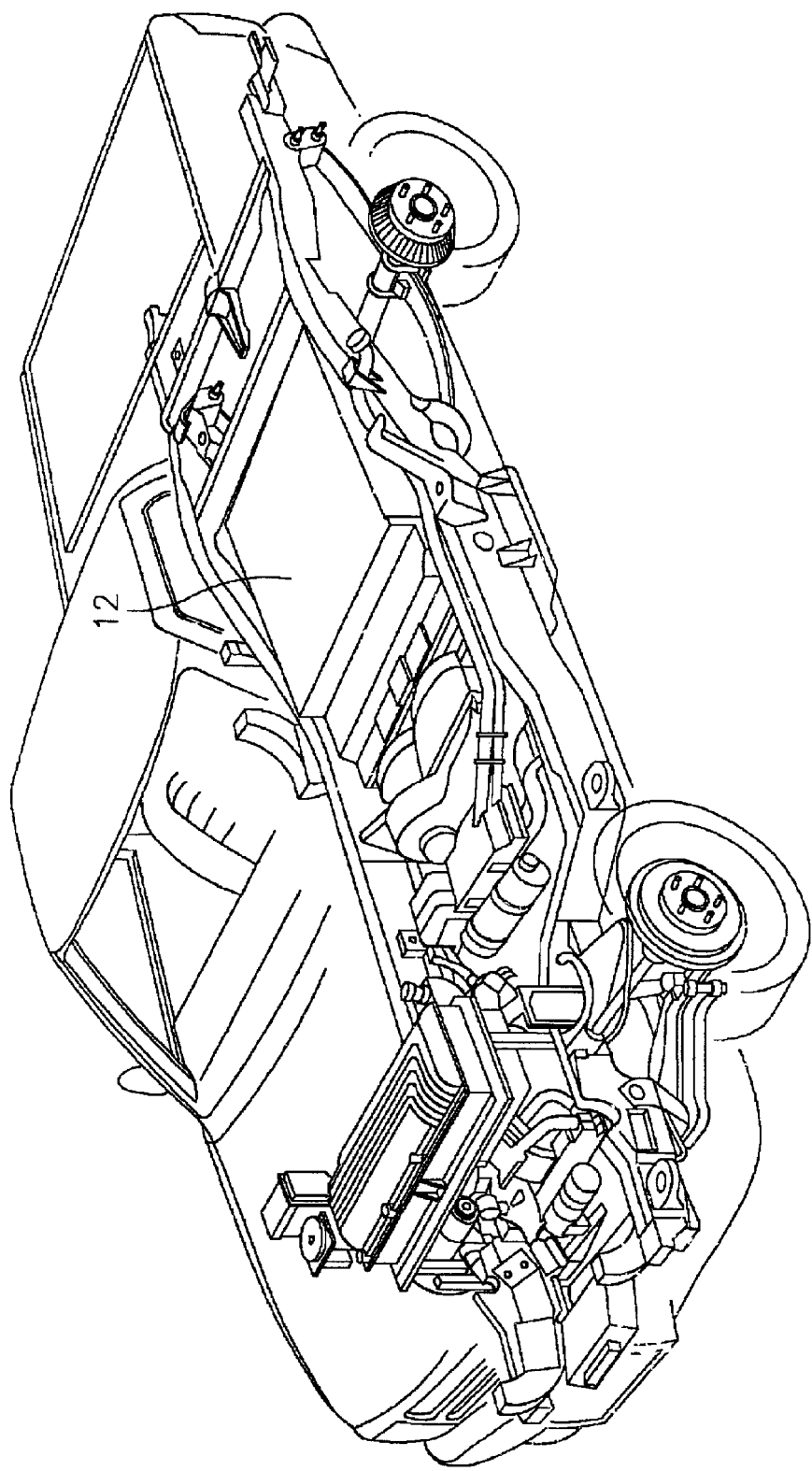
FIG. 1 is a perspective view of a vehicle having a housing for an electrical storage medium.

Referring now to FIG. 1, a vehicle 10 having an electrical storage medium 12 for providing electrical energy to a vehicle propulsion system is illustrated.

Figure 2:
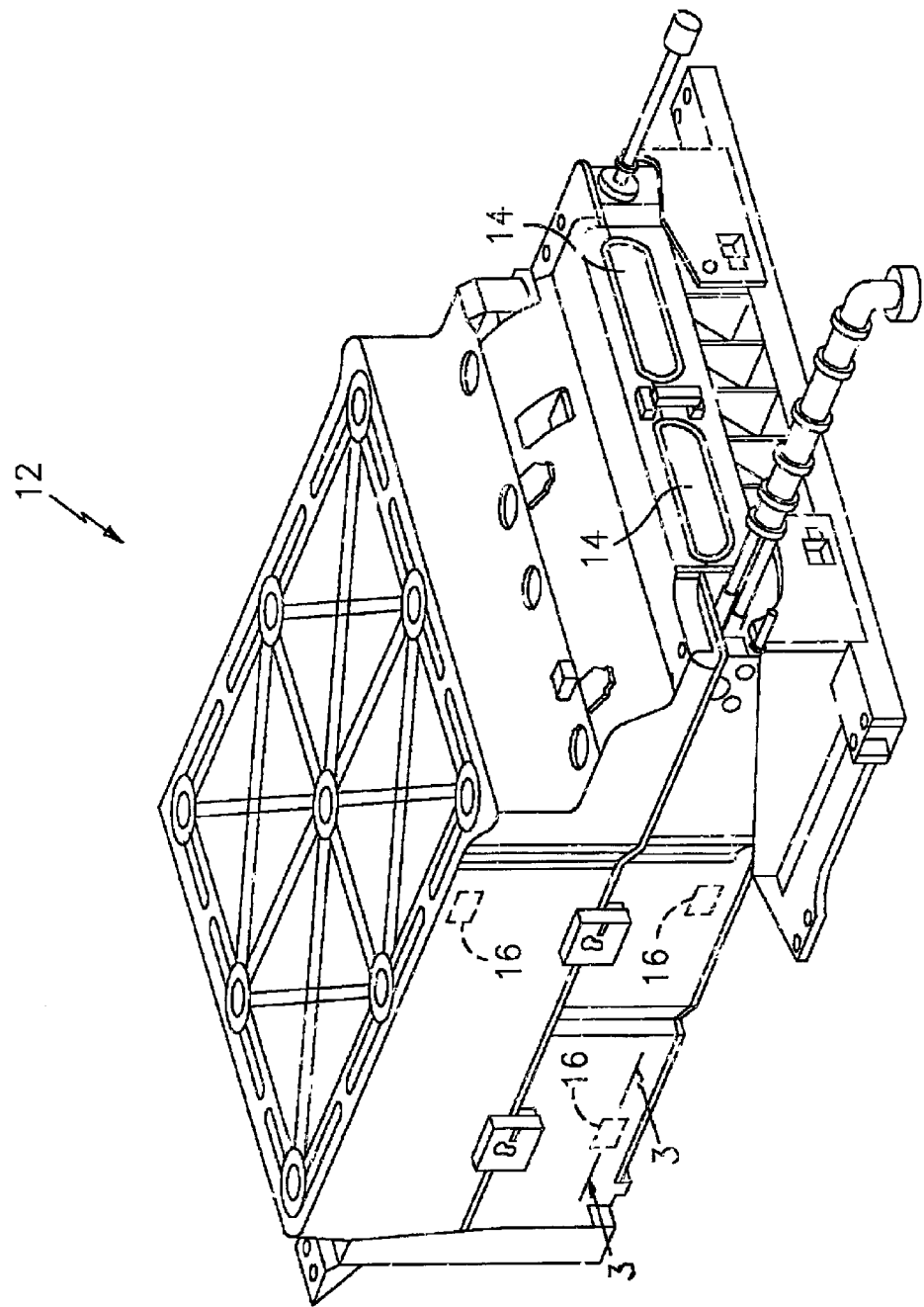
FIG. 2 is a perspective view of a housing for a battery pack.

Referring now to FIG. 2, electrical storage medium 12 is illustrated. Electrical storage medium 12 houses a plurality of batteries (e.g., NiMH or lead acid) for receiving, storing and supplying voltage to vehicle 10.

In order to maintain or control the temperature within electrical storage medium 12 and exchange the air within electric storage medium 12, an air circulation system provides air to the internal compartment of electrical storage medium 12 through the use of air ducts 14. Air ducts 14 are configured to be in fluid communication with the vehicle's heating, ventilating and air-conditioning system or alternatively or in combination with ambient air.

In an exemplary embodiment, at least 10% of the air provided to the internal compartment of electrical storage medium 12 comprises ambient air. It is contemplated that the percentage of ambient air may be greater or less than 10%. Accordingly, and since a portion of the air flow into the internal compartment of the electrical storage medium consists of ambient air, the air flow will contain a percentage of moisture.

In order to ensure that water or moisture does not accumulate within electrical storage medium 12, a plurality of drain openings 16 are positioned in the lowest surface of electrical storage medium 12 in order to facilitate draining of any moisture. In an exemplary embodiment, four drain openings are located at each corner of the lower surface of electrical storage medium 12. Alternatively, the number and location of drain openings 16 may vary. Preferably, drain openings 16 are located at the lowest point of the housing of electrical storage medium 12. Each drain opening 16 is fitted with a draining device 18.

Referring now to FIGS. 3–7, draining device 18 is illustrated. Draining device 18 has a threaded portion 20 for being meshingly engaged by a complementary threaded surface in drain opening 16. Alternatively, draining device 18 is pressed fitted into drain opening 16. A preferred material for draining device 18 is polystyrene. Of course, other materials capable of being easily molded are contemplated for use in manufacturing draining device 18. Such materials include but are not limited to plastic, rubber, metal, etc.

Threaded portion 20 includes an inner opening 22 which is in fluid communication with a pair of side openings 24. Side openings 24 are disposed in an annular portion 26 of draining device 18. Annular portion 26 includes a shoulder portion 28 that makes contact with a portion 30 of the housing of electrical storage medium 12. Portion 30 is disposed about the periphery of drain opening 16. Accordingly, once draining device 18 is fully inserted into drain opening 16, shoulder portion 28 makes contact with portion 30, thereby limiting the travel of draining device 18 into opening 16. More particularly, portion 28 limits the travel of draining device 18 so that side openings 24 are positioned below opening 16 once draining device 18 is fully engaged into opening 16.

Figure 3:
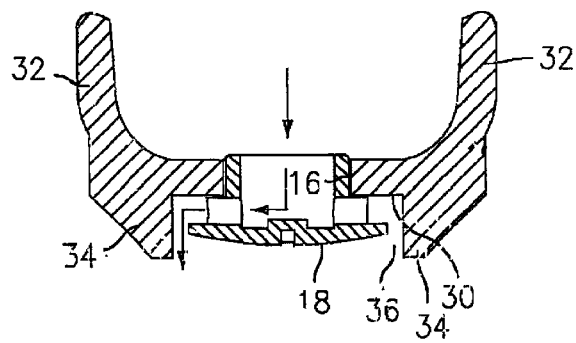
FIG. 3 is a view along lines 3—3 of FIG. 2.
Figures 4, 5:
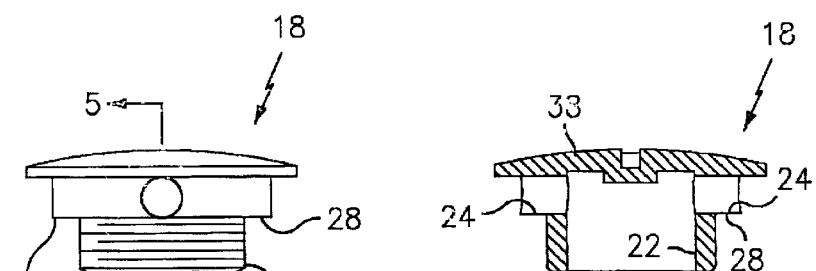
FIG. 4 is a side elevation view of a draining device constructed in accordance with an exemplary embodiment of the present invention.
FIG. 5 is a view along lines 5—5 of FIG. 4.
Figures 6, 7:
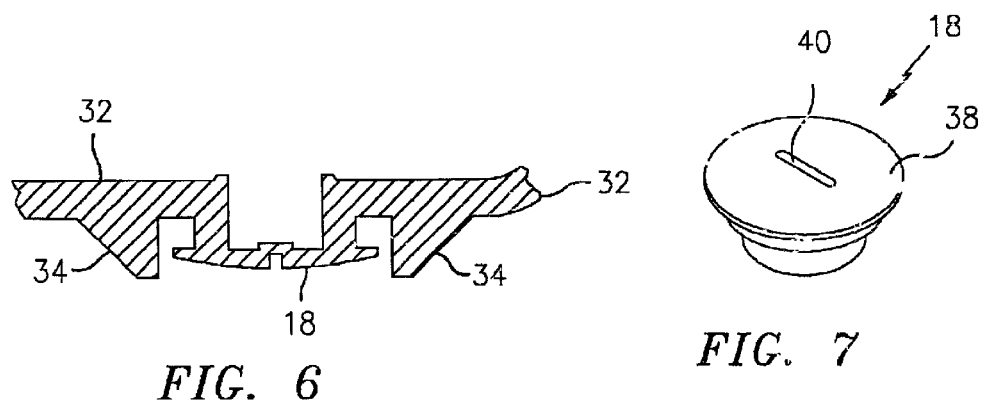
FIG. 6 is a cross-sectional view of a draining device inserted into a housing.
FIG. 7 is a perspective view of a draining device constructed in accordance with an exemplary embodiment of the present invention.

As illustrated in FIGS. 3 and 5 and in accordance with an exemplary embodiment of the present invention, side openings 24 are positioned 180 degrees from each other. In addition, side openings 24 are orthogonally arranged with respect to inner opening 22. It is contemplated that in accordance with an alternative embodiment side openings 24 are configured to be arranged at an angle greater than or less than 90 degrees. Thus, fluid may pass from the interior of the housing of electrical storage medium 12 to the exterior. Fluid communication is indicated by the arrows in FIG. 3. The configuration of side openings 24 and inner opening 22 allows fluid to pass out of the electric storage housing while limiting or preventing backwash of any fluid into the internal compartment of the electric storage medium.

An exemplary draining device 18 includes two side openings 24 positioned 180 degrees from each other. As an alternative, multiple side openings are arrangable at various degrees from each other. For example, four side openings 24 are positioned 90 degrees for each other. Of course, other arrangements and configurations are contemplated in accordance with the present invention.

Housing wall 32 is configured to have a protrusion or annular wall 34 surrounding the exterior portion of opening 16. Annular wall 34 defines a receiving area 36 into which draining device 18 is inserted.

Draining device 18 is configured to have a head portion 38 which in accordance with an exemplary embodiment extends radially outward from the center of draining device 18. Head portion 38 is configured to extend outwardly from the center of draining device 18 further than annular portion 26. Thus, a portion of head portion 38 extends over annular portion 26. Accordingly, and once draining device 18 is inserted into opening 16, a portion of head portion 38 provides a cover to side openings 24.

In addition, and in order to facilitate the securement of draining device 18 into opening 16, head portion 38 has a slotted opening 40 for receipt of a tool such as a screwdriver in order to provide a rotational force to draining device 18 as it is inserted into opening 16. As an alternative, slotted opening 40 is configured to receive a Phillips head screwdriver, Allen wrench, star driver, etc.

In accordance with an exemplary embodiment of the present invention, the outer diameter or circumference of head portion 38 is slightly smaller than the inside diameter of receiving area 36. Accordingly, a peripheral opening is positioned to allow for fluid communication between housing 32 and its exterior.

In addition, and in order to prevent backflow or splashing of a fluid into the interior of housing 32, annular wall 34 provides a blocking feature for direct fluid communication into side openings 24. Moreover, the configuration between opening 22 and side openings 24 further prevents direct fluid communication from side opening 24 into inner opening 22 and ultimately the interior of housing 32. Thus, the configuration of inner opening 22, side openings 24, annular wall 34 and the head portion 38 provide a means for allowing fluid to pass from the interior of housing 32 to the exterior without providing a path for backflow of fluids such as water.

In accordance with an exemplary embodiment of the present invention, draining device 18 is equipped with the following dimensions: head portion 38, diameter 30 mm, height 3 mm and an extending portion of 3 mm radially; annular portion 26, diameter 24 mm, height 4.4 mm; side openings 24, diameter 4.2 mm; and inner opening 22, diameter 13.9 mm, height 6.2 mm.

Of course, and as applications may require, the aforementioned dimensions of draining device 18 may vary.

It is also contemplated that draining device 18 may be used in conjunction with or without retaining wall 34.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A draining device, comprising:
a threaded portion depending outwardly from an annular portion, said threaded portion having an inner opening in fluid communication with a pair of openings in said annular portion, said threaded portion being configured for meshingly engaging an opening in a housing, said annular portion extending outwardly from said threaded portion to define a shoulder portion, said shoulder portion contacting said housing when said threaded portion is meshingly engaged in said opening, said pair of openings providing a pathway for fluid to pass from said housing.

2. A unidirectional draining device, comprising:
an annular portion having a pair of side openings, said side openings being in fluid communication with an inner opening of a threaded portion of said draining device, said threaded portion being received and engaged by an opening in a housing of an electric storage medium, said housing been ventilated by an HVAC system in partial fluid communication with ambient air.

3. A draining device, comprising:
a plug member having a threaded portion, an annular member and a head portion, said annular member being disposed between said head portion and said threaded portion; and
an elongated opening disposed within said threaded portion, said elongated opening being in fluid communication with a pair of openings in said annular member.

4. The draining device as in claim 3, wherein said threaded portion of said plug member is configured to be received and engaged in an opening in a housing of an electrical storage medium.

5. The draining device as in claim 4, wherein said housing of said electrical storage medium is configured for use in a vehicle.

6. The draining device as in claim 3, wherein said elongated opening is orthogonally positioned with respect to said pair of openings.

7. The draining device as in claim 6, wherein said pair of openings are positioned 180 degrees from each other.

8. The draining device as in claim 3, wherein said pair of openings are positioned 180 degrees from each other.

9. The draining device as in claim 3, wherein said head portion extends outwardly from said annular member.

10. The draining device as in claim 8, wherein said head portion extends outwardly from said annular member.

11. The draining device as in claim 9, wherein said plug member is molded out of polystyrene.

12. The draining device as in claim 9, wherein said threaded portion of said plug member is configured to be received and engaged in an opening in a housing of an electrical storage medium and said housing is configured to have a wall member surrounding said opening and defining a receiving area for receiving said annular member and said head portion of said plug member.

13. The draining device as in claim 12, wherein the diameter of said head portion is slightly smaller than said receiving area.

14. The draining device as in claim 3, wherein said threaded portion of said plug member is configured to be received and engaged in an opening in a housing of an electrical storage medium and said housing is configured to have a wall member surrounding said opening and defining a receiving area for receiving said annular member and said head portion of said plug member.

15. A housing for an electric storage medium of a vehicle, comprising:

a plurality of openings in a lower surface of said housing;

a plurality of plug members each having a threaded portion, an annular member and a head portion, said annular member being disposed between said head portion and said threaded portion, said threaded portion being configured to be received and engaged in one of said plurality of openings; and an elongated opening disposed within said threaded portion, said elongated opening being in fluid communication with a pair of openings in said annular member.

16. The housing as in claim 15, further comprising:

a plurality of retaining walls being configured to surround said plurality of openings, said plurality of retaining walls defining a plurality of receiving areas adjacent to said plurality of openings, said plurality of receiving areas being configured to receive said annular member and said head portion of said plug members.

* * * * *